(No Model.)
E. WESTON.
ELECTRICAL METER.
No. 283,547. Patented Aug. 21, 1883.
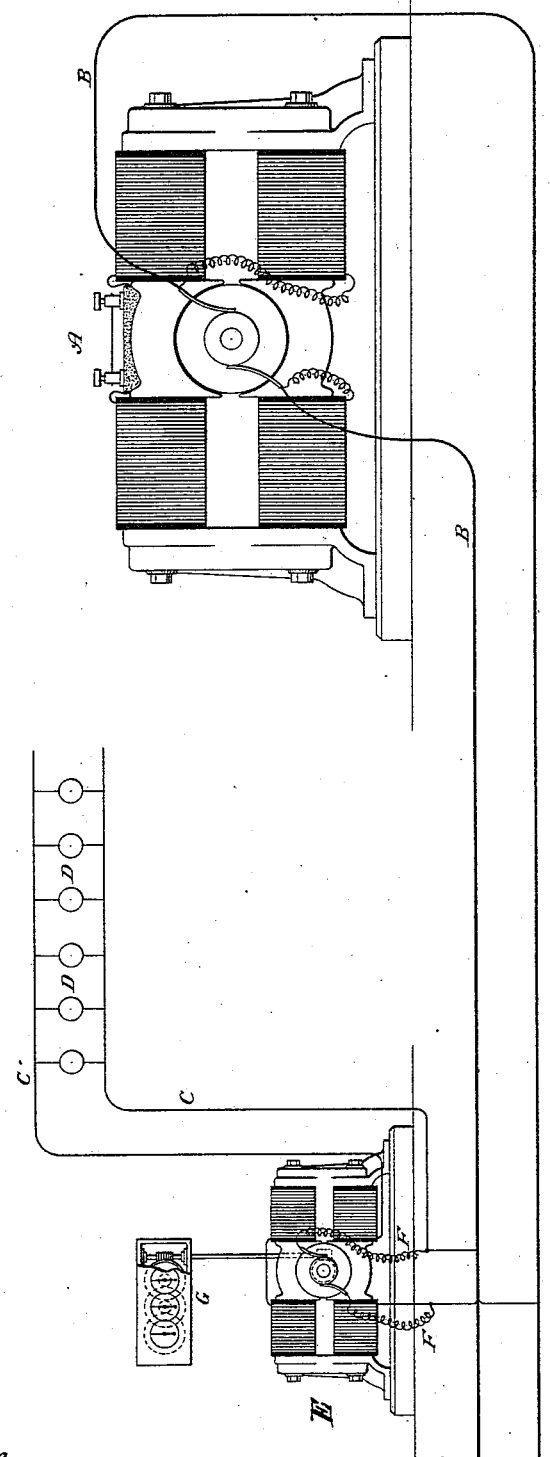
Attest:
Raymond L. Barnes.
J. V. Frisby
Inventor:
Edward Weston
By Parker W. Page
att'y

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL METER.

SPECIFICATION forming part of Letters Patent No. 283,547, dated August 21, 1883.

Application filed March 23, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Electrical Meters, of which the following is a specification, reference being had to the drawing accompanying and forming a part of the same.

The object of my invention is to provide an apparatus for measuring and recording the flow of current in a circuit, or in any branch of a circuit, the object being more especially to obtain a record of current in a system for running incandescent electric lamps, wherein the lamps are included in multiple or derived circuits from the main conductors. To accomplish this I employ an electro-magnetic motor in conjunction with a recording mechanism for indicating the number of revolutions made by the motor in a given time, and this motor I so arrange with reference to the circuit in which the flow of current is to be ascertained that its speed will at all times be proportioned to the flow. This will be explained by reference to the drawing, which is a diagrammatic illustration of a part of an electric-lighting system, illustrating the means invented by me of measuring the flow of current.

Let A designate any electrical generator; B B, conductors leading from the same to desired points; C C, a branch circuit from the main conductors, and D D a given number of incandescent lamps or similar devices included in multiple arc with the branch circuits.

If it be desired to obtain a record of the current that is drawn from the main line for running the lamps D, I employ an electro-magnetic motor, E, to the shaft of which is properly geared a register, G, to indicate the number of turns made by said shaft. The field of this motor I include in one branch of the circuit C C. The armature is included in a circuit, F F, between the conductors of the circuit C C. The resistance of the field-circuit of the motor is so low as not to affect, to an appreciable degree, the resistance of the circuit C C. The armature-circuit, on the contrary, is of quite high resistance, so that it absorbs but little current. When thus arranged the motor and register operate as a current-meter, inasmuch as the following conditions obtain: The speed of the armature, other things being equal, depends upon the intensity of field magnetism. In this case, the intensity of the field depending directly on the number of lamps D, the speed would be an indication of the current flowing, provided that no disturbing causes exist. That such is the case is evident from the fact that the resistance of circuit F F never varies, while the pressure or electro-motive force in the main circuit remains always constant. The amount of current that flows through circuit F would be always the same, therefore, but for the counter electro-motive force produced by the motor. This is, however, directly proportioned to the speed, so that the ratio of speed to current flowing is always the same—given increments of currents, in other words, producing given increments in the speed of the motor. The retarding effects of friction and resistance of the air in the case of a motor used in this manner I have found to be so small that they may, for practical purposes, be disregarded.

It is of course essential that the electro-motive force in the circuits B B or C C be constant, which may be either done by a properly-constructed machine, or by the employment of regulating mechanism.

I am aware that motors have heretofore been employed in combination with registers, and that the same, when combined with devices for imposing a load upon the motor, have been employed as meters. I am not, however, aware that an unloaded motor has been used in the manner described, and What I therefore claim is—

1. The combination, with a main circuit and multiple-arc or derived circuits, of a motor and a register for indicating the number of revolutions of the same, the field of the motor being included in the main circuit and the armature in one of the multiple-arc or derived circuits, as and for the purpose set forth.

2. The combination, with a main circuit and multiple-arc or derived circuits, of a combined register and unloaded motor, the field of said motor being included in the main circuit and the armature in one of the multiple or derived circuits, as and for the purpose set forth.

In testimony whereof I have hereunto set my hand this 21st day of March, 1883.

EDWARD WESTON.

Witnesses:
HENRY A. BECKMEYER,
L. V. E. INNES.